Dec. 8, 1964   J. H. HANKEY   3,159,884
INFLATABLE WEATHERSTRIPPING
Filed July 25, 1962

JOHN H. HANKEY
INVENTOR

BY Walter G. Finch
ATTORNEY 3,159,884
INFLATABLE WEATHERSTRIPPING
John H. Hankey, 701 Crain Highway NE.,
Glen Burnie, Md.
Filed July 25, 1962, Ser. No. 212,325
2 Claims. (Cl. 20—56.4)

This invention relates generally to weatherstripping, and more particularly it pertains to a window glass retainer.

An object of this invention is to provide a hollow inflatable window socket arrangement which will not leak, holds the window glass firmly without strain, conforming both to the glass and frame without caulking, and can be quickly and easily installed without tools.

Another object of this invention is to provide a channel for setting glass firmly and safely and which is readily removed for replacing broken panes and can be re-used many times.

To provide a sealing device self-adapting to thickness variations and conformable to curved edges and bends of glass windshields, is another object of this invention.

Yet another object of this invention is to provide a simple, strong, durable and relatively inexpensive sealing device and reveal moulding holder for window glass installation by relatively inexperienced personnel.

Figure 1:
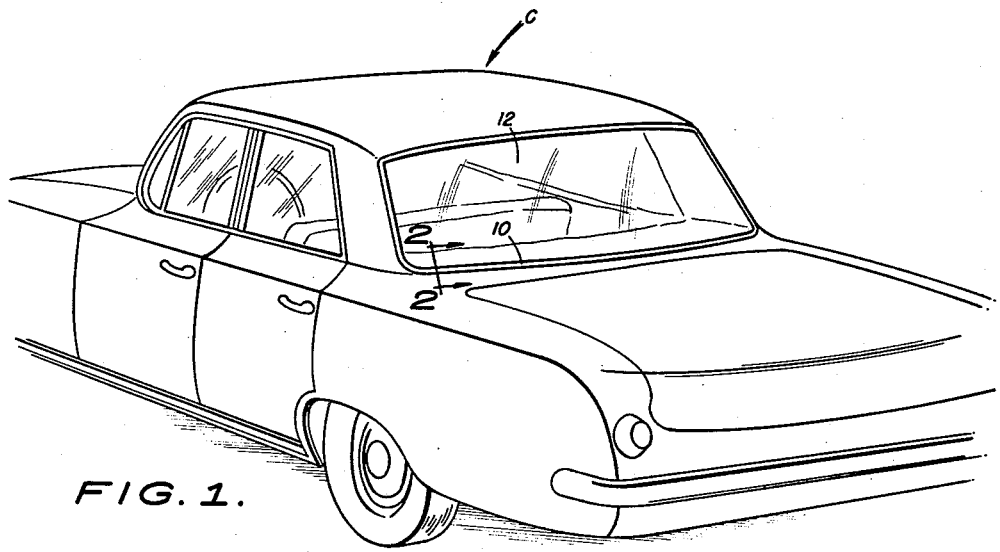
Figure 2:
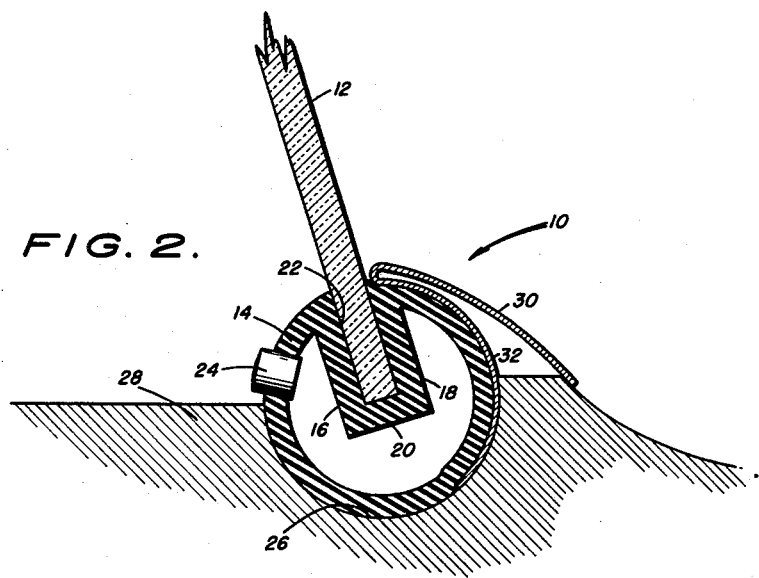

Other objects and attendant advantages of this invention will become more readily apparent and understood from the accompanying specification and single sheet of drawings in which:

FIG. 1 is a perspective view of a window glass installation on a vehicle showing a typical application of the invention; and FIG. 2 is a fragmentary section view, much enlarged, taken on line 2—2 of FIG. 1, of the inflatable weatherstripping of this invention.

Referring now to the drawings, a weather strip designated generally by reference numeral 10 is shown mounting a curved and bent glass panel 12 in an opening of a vehicle C.

This weatherstrip 10 is made of elastic rubber or plastic in the form of an endless tube 14 extending around the periphery and embracing the edges of the panel 12. The tube 14 incorporates a rectangularly shaped re-entrant well 22 made up of a pair of straight sides 16 and 18 and a flat bottom 20 and extending the entire length of the strip 10.

In a deflated condition, the tubing 14 is stretched around the periphery of the panel 12 and the edges of the glass seated in the well 22. Then the assembly is forced into a rounded groove or slot 26 of the same radius as the tubing 14 which is formed around the opening or frame 28 of the car C.

The curved tail 32 of a reveal molding 30 which is formed to the normal radius of the tubing 14 is next pressed thereagainst extending partly into the groove or slot 26 as shown in FIG. 2.

In this manner, it can be seen that the tubing 14 of the weather strip 10 is encompassed to greater than 180 degrees. When the tubing 14 is inflated through a plug or valve stem 24 it is securely held in place conforming to any irregularities around the frame 28. Moreover, the sides 16 and 18 and bottom 20 of the well 22 are forced by air pressure to conform to the edge of the glass panel 12 holding it softly but firmly with a hermetic seal.

This improved weatherstrip 10 eliminates garnish moldings and requires no screws or clips to hold the outer reveal moulding. It will not lose its resilience after being pressed in one position for a long time and is self-adapting to a considerable range of glass thickness and to any configuration or bend shape.

The weatherstrip 10 is easily deflated and relaxed and, with no screws in the molding to remove, a broken panel 12 is quickly and economically replaced.

Obviously, many modifications and variations of the present invention are possible in light of the above teachings. It is, therefore, to be understood that within the scope of the appended claims the invention may be practiced otherwise than as specifically described.

What is claimed is:

1. An inflated weatherstripping construction for a panel, comprising, frame structure defining an opening and having an inner peripheral groove, a panel mountable in said opening in said frame structure, an endless inflatable tube positioned in said inner peripheral groove and having a well re-entrantly formed in said tube and extending throughout the length thereof, the edge periphery of said panel being seated in said re-entrant well, said groove having a cross-sectional shape which permits said tube when inflated to be removed therefrom, and reveal molding having a tail forming a continuation above said groove of the surface of said groove along one side thereof and extending into said groove between the surface thereof and said tube, said continuation above said groove reducing its width sufficiently so that said tube when inflated is not removable from said groove, said tube being inflatable with a pressurized medium so that said well in said tube firmly engages the edge periphery of said panel and so that said tube tightly fills the cavity formed by said groove and said continuation thereabove along one side of said groove to form a seal between said panel and said opening in said frame structure, said reveal molding being held solely in position by the pressure exerted by the inflated tube on the portion of the tail thereof extending into said groove against said groove to form a trim for said opening, whereby when said tube is deflated, said reveal molding is released from said pressure and is removable from said groove whereupon subsequent removal of said panel and said tube is facilitated.

2. An inflated weatherstripping construction for a panel, comprising, frame structure defining an opening and having an inner peripheral groove of substantially semi-circular cross-section, a panel mountable in said opening in said frame structure, an endless inflatable tube positioned in said inner peripheral groove and having a rectangularly shaped well re-entrantly formed in said tube and extending throughout the length thereof, the edge periphery of said panel being seated in said re-entrant well, and reveal molding having a curved tail forming a continuation above said groove of the surface of said groove along one side thereof and extending into said groove between the surface thereof and said tube, said tube being inflatable with a pressurized medium so that said well in said tube firmly grips the edge periphery of said panel and so that said tube tightly fills the cavity formed by said groove and said continuation thereabove along one side of said groove to form a seal between said panel and said opening in said frame structure, said reveal molding being held solely in position by the pressure exerted by the inflated tube on the portion of the tail thereof extending into said groove against said groove to form a trim for said opening.

References Cited in the file of this patent
UNITED STATES PATENTS 2,039,836 Potter _____ May 5, 1936
2,700,196 Panhard _____ Jan. 25, 1955